US009867007B1

(12) United States Patent
Wang et al.

(10) Patent No.: US 9,867,007 B1
(45) Date of Patent: Jan. 9, 2018

(54) FINE DISTANCE DETERMINATION FOR USER EQUIPMENT (UE) THAT ARE SERVED BY WIRELESS REPEATER CHAINS

(71) Applicant: Sprint Communications Company L.P., Overland Park, KS (US)

(72) Inventors: Yu Wang, Fairfax, VA (US); Sanghoon Sung, Ashburn, VA (US); Dhaval Dipak Mehta, Aldie, VA (US); Udit A. Thakore, Fairfax, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 15/363,312

(22) Filed: Nov. 29, 2016

(51) Int. Cl.
*H04W 24/00* (2009.01)
*H04B 17/00* (2015.01)
*H04L 12/28* (2006.01)
*H04W 4/02* (2009.01)
*H04L 12/26* (2006.01)
*H04B 7/14* (2006.01)
*H04W 24/10* (2009.01)
*H04W 88/02* (2009.01)
*H04W 88/08* (2009.01)

(52) U.S. Cl.
CPC .............. *H04W 4/023* (2013.01); *H04B 7/14* (2013.01); *H04L 43/0864* (2013.01); *H04W 24/10* (2013.01); *H04W 88/02* (2013.01); *H04W 88/08* (2013.01)

(58) Field of Classification Search
CPC ...... H04B 7/14; H04L 43/0864; H04W 4/023; H04W 24/10; H04W 88/02; H04W 88/08

USPC ........................................................ 455/456.1
See application file for complete search history.

(56) References Cited

U.S. PATENT DOCUMENTS

| | | | |
|---|---|---|---|
| 6,501,955 B1 | 12/2002 | Durrant et al. | |
| 6,839,539 B2 | 1/2005 | Durrant et al. | |
| 7,486,934 B2 | 2/2009 | Tanoue | |
| 7,546,084 B2 | 6/2009 | Kennedy, Jr. et al. | |
| 7,822,427 B1 * | 10/2010 | Hou ................... | H04W 36/385 370/274 |
| 8,073,387 B2 | 12/2011 | Maslennikov et al. | |
| 8,331,956 B2 | 12/2012 | Islam et al. | |
| 8,626,060 B2 | 1/2014 | Wang et al. | |
| 8,718,542 B2 | 5/2014 | Braithwaite | |
| 9,264,851 B2 | 2/2016 | Loetter | |

(Continued)

*Primary Examiner* — Rafael Pérez-Gutiérrez
*Assistant Examiner* — Mark G. Pannell

(57) ABSTRACT

A wireless communication network determines a fine distance between a wireless base station and User Equipment (UE). The wireless communication network comprises a wireless repeater chain that is coupled to the wireless base station and that serves the UE. The wireless base station determines Round Trip Delay (RTD) between the wireless base station and the UE. The wireless base station determines if the RTD indicates that the UE is beyond a wireless base station range. The wireless base station determines if the wireless base station serves a wireless repeater chain. If the UE is beyond the wireless base station range and the wireless base station serves a wireless repeater chain, then the wireless base station determines a number of repeater hops between itself and the UE. The wireless base station then determines the fine distance between itself and the UE based on the number of wireless repeater hops.

20 Claims, 5 Drawing Sheets

(56) References Cited

U.S. PATENT DOCUMENTS

| | | | |
|---|---|---|---|
| 2003/0162550 A1* | 8/2003 | Kuwahara | G01S 5/0205 |
| | | | 455/456.1 |
| 2003/0190919 A1* | 10/2003 | Niemenmaa | G01S 5/10 |
| | | | 455/456.1 |
| 2005/0054312 A1* | 3/2005 | Spirito | H04B 7/2606 |
| | | | 455/226.1 |
| 2005/0078624 A1* | 4/2005 | Shu | H04W 24/02 |
| | | | 370/328 |
| 2005/0096066 A1* | 5/2005 | Lee | G01S 5/0205 |
| | | | 455/456.1 |
| 2005/0266802 A1* | 12/2005 | Wolf | G01S 13/82 |
| | | | 455/67.11 |
| 2007/0047469 A1* | 3/2007 | Vasseur | H04L 45/02 |
| | | | 370/255 |
| 2010/0110934 A1* | 5/2010 | Li | G06F 12/0831 |
| | | | 370/256 |
| 2016/0204847 A1 | 7/2016 | Ryu et al. | |

* cited by examiner

| | | | | | WIRELESS BASE STATION DATA STRUCTURE 300 | | | | | | | |
|---|---|---|---|---|---|---|---|---|---|---|---|---|
| | | | | | HOP 1 RPTR | | | HOP 2 RPTR | | | ... HOP N RPTR | | |
| BS ID | BS L/L/A | BS RANGE | RPTR DONOR | RPTR HOPS | L/L/A | RANGE | DELAY | L/L/A | RANGE | DELAY | ... | L/L/A | RANGE | DELAY |
| 120 | X/Y/Z | R0 | YES | 3 | X1/Y1/Z1 | R1 | D1 | X2/Y2/Z2 | R2 | D2 | ... | XN/YN/ZN | RN | DN |
| A | X/Y/A | R0 | NO | | | | | | | | | | | |
| B | X/Y/Z | R0 | YES | 6 | X1/Y1/Z1 | R1 | D1 | X2/Y2/Z2 | R2 | D2 | ... | XN/YN/ZN | RN | DN |

FIGURE 3

FINE DISTANCE DETERMINATION FOR USER EQUIPMENT (UE) THAT ARE SERVED BY WIRELESS REPEATER CHAINS

TECHNICAL BACKGROUND

Data communication systems exchange user data for User Equipment (UE) to provide various data communication services. The UEs may be phones, computers, media players, intelligent machines, and the like. The data communication services might be media streaming, video conferencing, machine-to-machine data transfers, internet access, or some other data communication service.

Data communication systems use wireless base stations to extend the range of their communication services and enable user mobility. The wireless base stations perform wireless networking tasks like device handovers, radio interference management, and multipoint coordination. In Long Term Evolution (LTE) networks, the wireless base stations are evolved Node Bs (eNodeBs).

To extend the wireless footprint even more, wireless repeaters are used in between the wireless base stations and the UEs. A wireless repeater receives a wireless signal from a UE and then amplifies, filters, and retransmits the signal for receipt by the wireless base station or another wireless repeater. Likewise, a wireless repeater receives a wireless signal from the wireless base station. The wireless repeater amplifies, filters, and retransmits the signal for receipt by the UE or another wireless repeater. Chains or sequences of wireless repeaters are often used to cover roadways and trails with wireless data communication service.

The wireless base stations locate the UEs for emergency services and other tasks. Part of this location process includes the determination of a distance from the wireless base station to the UE. Typically, a fine distance is determined by performing a Round Trip Delay (RTD) test and multiplying half of the RTD by the speed of light (RTD/2*C). Unfortunately, the wireless relay chain makes it difficult to locate the UE using RTD. Due to internal processing delays in the wireless repeaters, current UE location techniques using RTD may not be accurate. The lack of UE location accuracy in wireless repeater chains inhibits the delivery of the emergency services and the performance of other tasks.

Technical Overview

A wireless communication network determines a fine distance between a wireless base station and User Equipment (UE). The wireless communication network comprises a wireless repeater chain that is coupled to the wireless base station and that serves the UE. The wireless base station determines Round Trip Delay (RTD) between the wireless base station and the UE. The wireless base station determines if the RTD indicates that the UE is beyond a wireless base station range. The wireless base station determines if the wireless base station serves a wireless repeater chain. If the UE is beyond the wireless base station range and the wireless base station serves a wireless repeater chain, then the wireless base station determines a number of repeater hops between itself and the UE. The wireless base station then determines the fine distance between itself and the UE based on the number of wireless repeater hops.

DESCRIPTION OF THE DRAWINGS

FIG. 3 illustrates a wireless communication network data structure to determine fine distance between the wireless base station and the UE.

DETAILED DESCRIPTION

Figure 1:
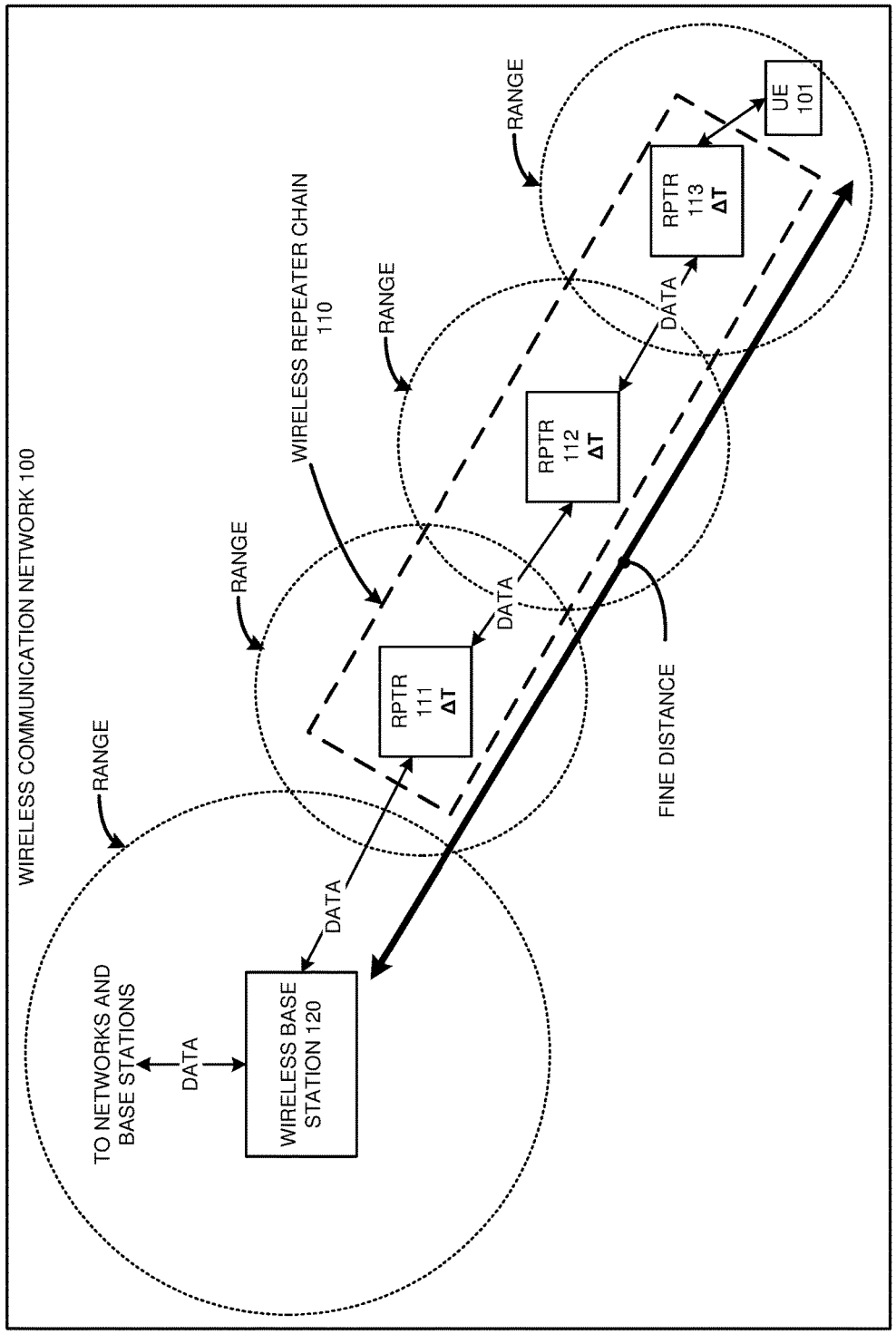
FIG. 1 illustrates a wireless communication network to determine fine distance between a wireless base station and User Equipment (UE).

FIG. 1 illustrates wireless communication network 100 to determine fine distance between wireless base station 120 and User Equipment (UE) 101. Wireless communication network 100 exchanges user data for UE 101. UE 101 comprises a computer, phone, or some other intelligent machine with a wireless communication transceiver. The data exchanges support data services such as content streaming, media conferencing, machine communications, internet access, or some other computerized information service.

Wireless communication network 100 comprises UE 101, wireless repeater chain 110, and wireless base station 120. Wireless repeater chain 110 comprises wireless repeaters (RPTRs) 111-113. Wireless repeaters 111-113 each comprise antennas, modulators, amplifiers, filters, and signal processing circuitry. Wireless repeaters 111-113 receive, amplify, and retransmit wireless communication signals.

Wireless base station 120 determines the fine distance between itself and UE 101. Wireless base station 120 comprises antennas, modulators, amplifiers, filters, and signal processors. Wireless base station 120 also has data processing circuitry, memory, operating software to control the transceivers and serve network applications. The network applications include UE attachment, network communication, and UE location. Wireless base station 120 could be an evolved Node B (eNodeB), Wireless Fidelity (WIFI) hotspot, 5G Millimeter Wave (MMW) access node, or some other computer system with wireless data interfaces.

UE 101 exchanges wireless data with wireless repeater 113 in wireless repeater chain 110. Wireless repeater 113 exchanges the wireless data with wireless repeater 112 in wireless repeater chain 110. Wireless repeater 112 exchanges the wireless data with wireless repeater 111 in wireless repeater chain 110. Wireless repeater 111 exchanges the wireless data with wireless base station 120. Wireless base station 120 exchanges the data with data networks or other base stations.

Note the circles that indicate distance ranges—the circle radius. The circle around wireless base station 120 indicates the maximum wireless communication distance served by wireless base station 120. The circles around repeaters 111-113 indicate the maximum wireless communication distance served by each of wireless repeaters 111-113.

Wireless base station 120 determines Round Trip Delay (RTD) between the wireless base station 120 and UE 101. Wireless base station 120 determines if it serves a wireless repeater chain. Wireless base station 120 determines if the RTD indicates that UE 101 is beyond its wireless base station range. If wireless base station 120 serves a wireless repeater chain and the RTD indicates that UE 101 is beyond the wireless base station range, then wireless base station 120 determines a number of repeater hops between itself and UE 101—three in this example. Wireless base station 120 then determines the fine distance between itself and UE 101 based on the number of repeater hops.

To determine if the RTD indicates that UE 101 is beyond the wireless base station range, wireless base station 120 first determines a rough distance between itself and UE 101 based a Round Trip Delay (RTD) divided in half times the speed of light. Wireless base station 120 then determines if the rough distance for UE 101 is beyond the wireless base station range. To determine the number of repeater hops between wireless base station 120 and UE 101, wireless base station 120 may determine internal processing delays and wireless repeater ranges for wireless repeaters 111-113 in wireless repeater chain 110. Wireless base station 120 also determines its own wireless base station range.

To determine the fine distance, wireless base station 120 removes the internal processing delays for wireless repeaters from the RTD measurement. This might entail wireless base station 120 summing the internal processing delays of wireless repeaters 111-113 in wireless repeater chain 110 and then subtracting the processing delay sum times the speed of light from RTD/2.

Wireless base station 120 or a supporting database may maintain a data structure that correlates wireless base station 120 with wireless repeater ranges for wireless repeaters 111-113 in wireless repeater chain 110. The data structure may correlate wireless base station 120 with internal processing delays for wireless repeaters 111-113 in the wireless repeater chain. The data structure may also correlate wireless base station 120 with an indication that it serves wireless repeater chains like wireless repeater chain 110.

Figure 2:
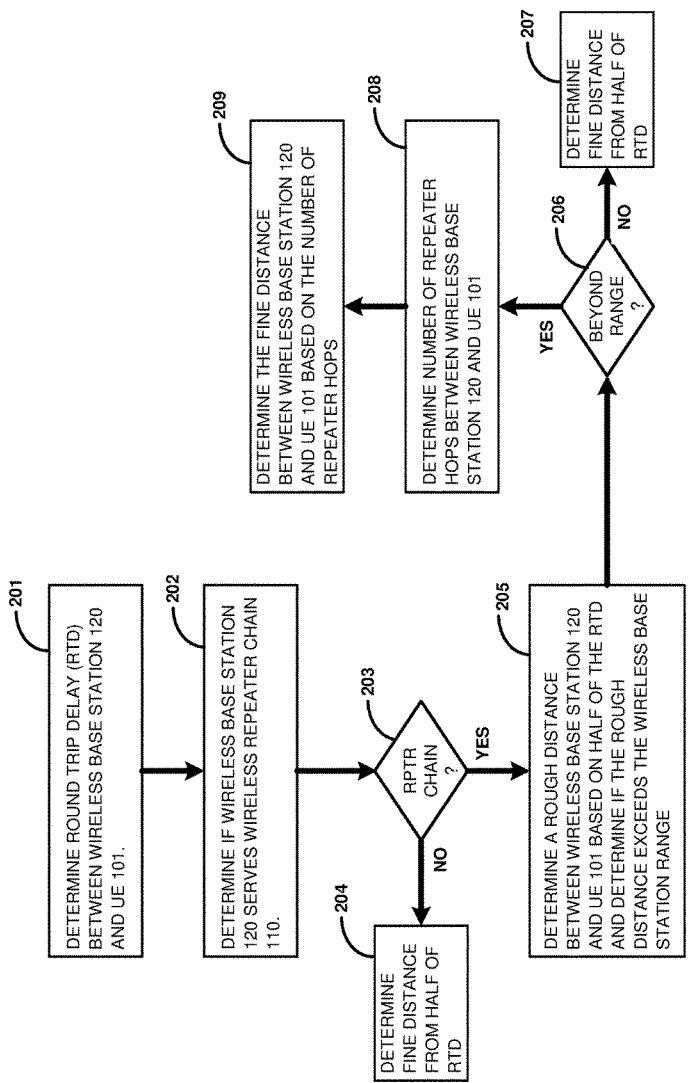
FIG. 2 illustrates the operation of the wireless communication network to determine fine distance between the wireless base station and the UE.

FIG. 2 illustrates the operation of wireless communication network 100 to determine fine distance between wireless base station 120 and UE 101. Wireless base station 120 determines RTD between the wireless base station 120 and UE 101 (201). Wireless base station 120 determines if it serves wireless repeater chain 110 (202). If wireless base station 120 does not serve wireless repeater chain 110 (203), then RTD/2*C is used to determine the fine distance between wireless base station 120 and UE 101 (204).

Wireless base station 120 determines a rough distance between itself and UE 101 based a RTD/2 (205). Wireless base station 120 then determines if the rough distance for UE 101 is beyond the wireless base station range (205). If RTD/2 indicates that UE 101 is beyond the wireless base station range (206), then wireless base station 120 determines a number of repeater hops between itself and UE 101 (208). If UE 101 is not beyond the wireless base station range (206), then RTD/2*C is used to determine the fine distance between wireless base station 120 and UE 101 (207). If UE 101 is beyond the wireless base station range (206), then wireless base station 120 determines the fine distance between itself and UE 101 based on the number of repeater hops (209). To determine the fine distance, wireless base station 120 removes the internal processing delays for wireless repeaters 111-113 from the RTD amount.

FIG. 3 illustrates wireless communication network data structure 300 to determine fine distance between wireless base station 120 and UE 101. Data structure 300 may be hosted by wireless base station 120 or by a supporting database for wireless base station 120. Data structure 300 lists base station (BS) identifiers (ID), base station latitude/longitude/altitude (L/L/A), base station range, repeater chains served, and the number of repeater hops in the repeater chain. Data structure 300 also lists data for each repeater hop like repeater latitude/longitude/altitude (L/L/A), repeater range, and internal repeater processing delay.

Wireless base station 120 uses data structure 300 to determine if it serves wireless repeater chain 110. Wireless base station 120 uses data structure 300 to determine its own range and the ranges of wireless repeaters 111-113 in wireless repeater chain 110. Wireless base station 120 uses its own range and RTD/2 to determine if UE 101 is beyond its own wireless base station range. Wireless base station 120 uses data structure 300 to determine the internal processing delays of wireless repeaters 111-113 in wireless repeater chain 110. Wireless base station 120 uses the processing delays and ranges for repeaters 111-113 to determine the number of repeater hops between itself and UE 101. The number of repeater hops may then be loaded into data structure 300 for subsequent use. Wireless base station 120 uses the number of repeater hops to determine the fine distance between itself and UE 101.

Figure 4:
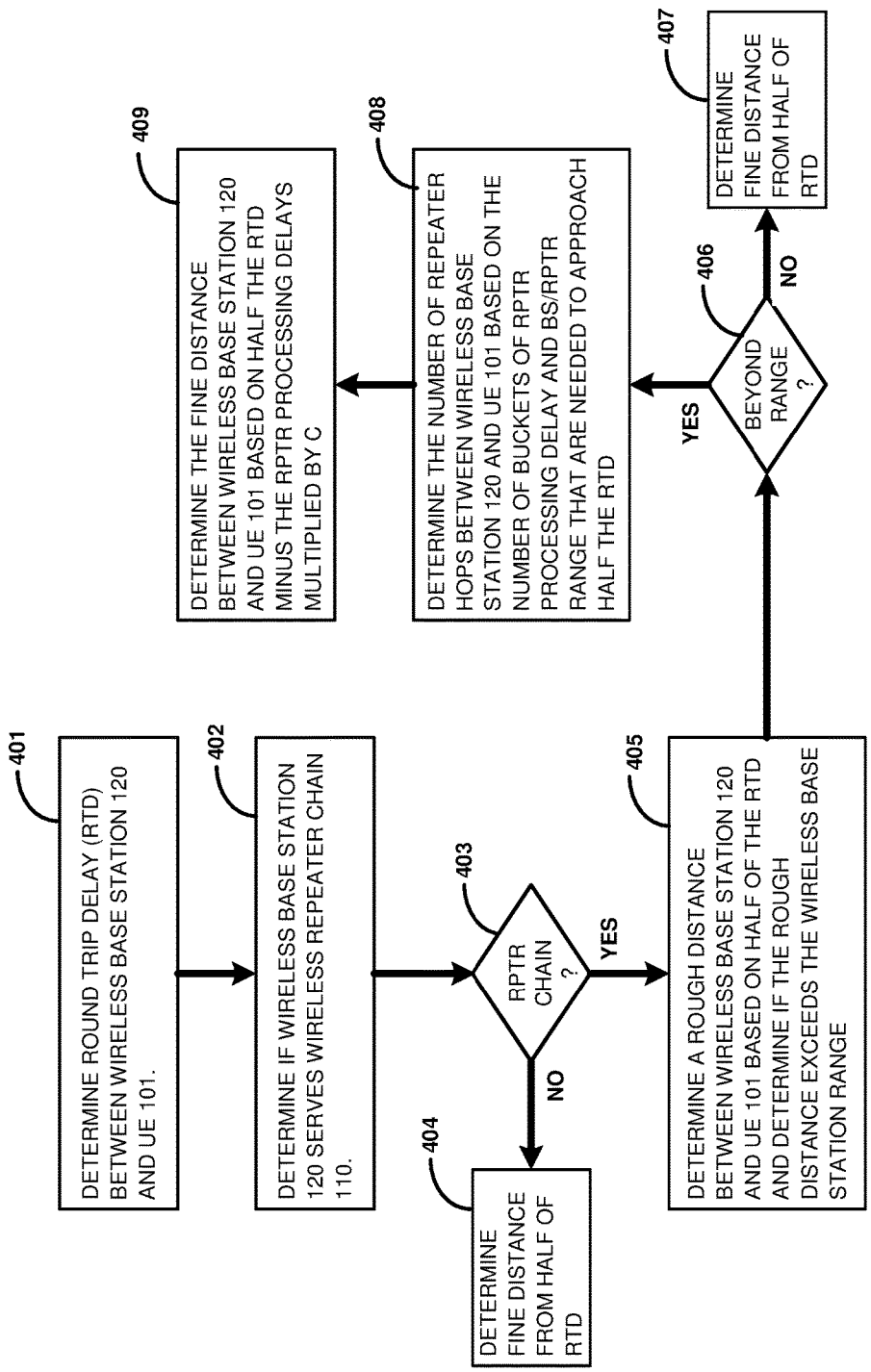
FIG. 4 illustrates the operation of the wireless communication network to determine fine distance between the wireless base station and the UE.

FIG. 4 illustrates the operation of wireless communication network 400 to determine fine distance between a wireless base station and a UE. The wireless base station determines RTD between the itself and the UE (401). The wireless base station determines if it serves a wireless repeater chain (402). If the wireless base station does not serve a wireless repeater chain (403), then RTD/2*C is used to determine the fine distance between the wireless base station and the UE (404).

The wireless base station determines a rough distance between itself and the UE based a RTD/2 (405). The wireless base station then determines if the rough distance for the UE is beyond the wireless base station range (405). If RTD/2 indicates that the UE is beyond the wireless base station range (406), then the wireless base station determines a number of repeater hops between itself and the UE (408). If the UE is not beyond the wireless base station range (406), then RTD/2*C is used to determine the fine distance between the wireless base station and the UE (407).

If UE 101 is beyond the wireless base station range (406), then wireless base station 120 determines the fine distance between itself and UE 101 based on the number of repeater hops (409). To determine the fine distance, the wireless base station solve Equation (1) below for the number of wireless repeater hops (#hops) by stepping i up from one to reach the rough distance at which i represents the actual number of repeater hops in the repeater chain. The wireless base station then solves Equation (2) below for the fine distance using the number of wireless repeater hops from Equation (1) to remove internal processing delay from RTD/2.

$$\text{Rough distance} \approx [bs\_range + \Sigma_{i=1}^{\#hops}(rptr\_range^i + (rptr\_delay^i * C))]. \quad (1)$$

$$\text{Fine distance} \approx (rtd/2 - \Sigma_{i=1}^{\#hops} rptr\_delay^i) * C. \quad (2)$$

Figure 5:
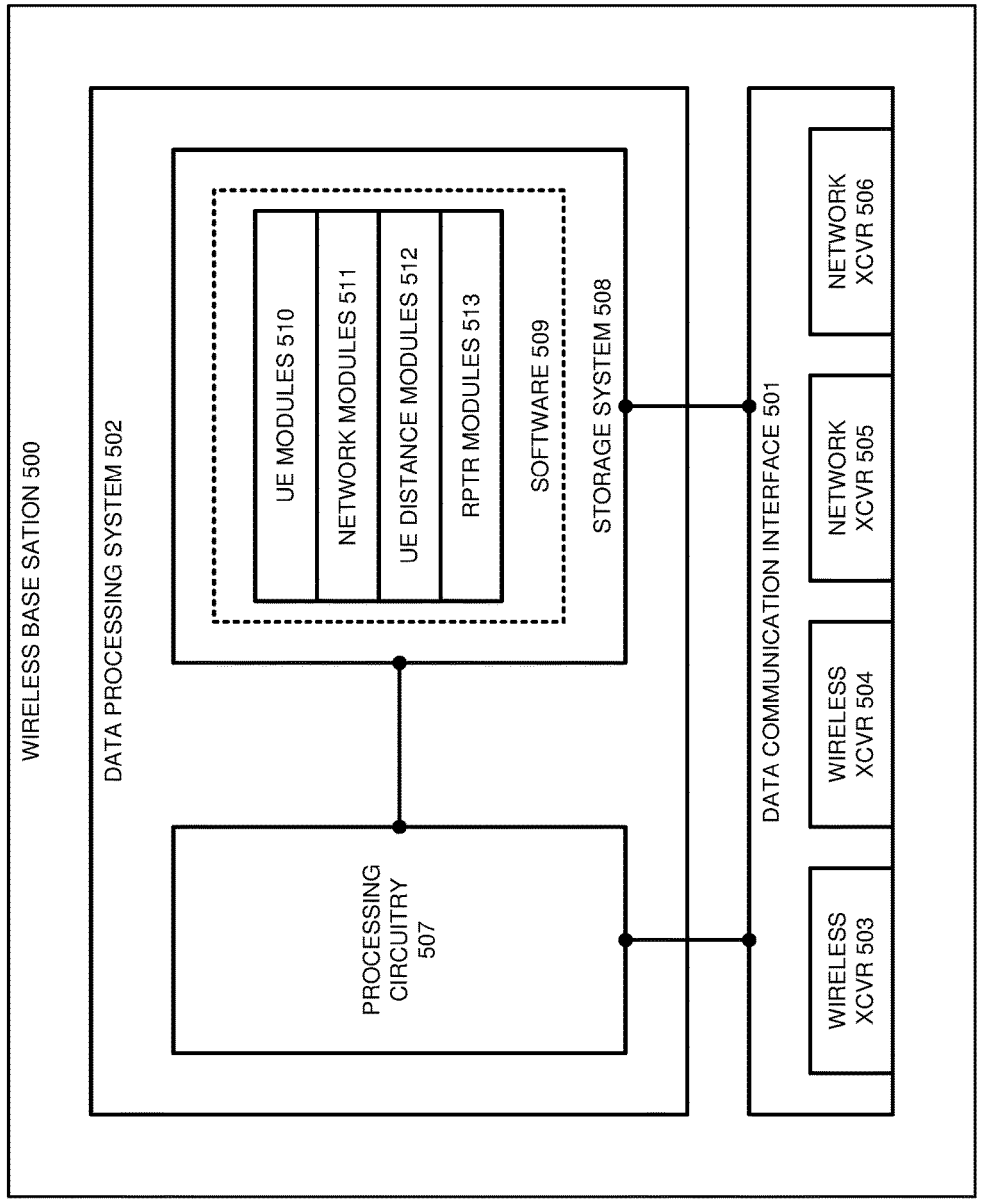
FIG. 5 illustrates a wireless base station to determine fine distance between the wireless base station and the UE.

FIG. 5 illustrates wireless base station 500 to determine fine distance between wireless base station 500 and a UE. Wireless base station 500 comprises data communication interface 501 and data processing system 502. Data communication interface 501 comprises wireless transceivers 503-504 and network transceivers 505-506. Data processing system 502 comprises processing circuitry 507 and storage system 508. Storage system 508 stores software 509. Software 509 includes respective software modules 510-513.

Wireless transceivers 503-504 comprise wireless communication components, such as antennas, amplifiers, filters, modulators, digital signal processors, bus interfaces, memory, software, and the like. Network transceivers 505-506 may comprise wireless and/or wireline communication components, such as ports, bus interfaces, digital signal processors, antennas, amplifiers, filters, modulators, memory, software, and the like.

Processing circuitry 507 comprises server blades, circuit boards, bus interfaces, integrated circuitry, and associated electronics. Storage system 508 comprises non-transitory, machine-readable, data storage media, such as flash drives, disc drives, memory circuitry, data servers, and the like. Software 509 comprises machine-readable instructions that control the operation of processing circuitry 507 when executed. Wireless base station 500 may be centralized or distributed. All or portions of software 509 may be externally stored on one or more storage media, such as circuitry, discs, and the like. Some conventional aspects of wireless base station 500 are omitted for clarity, such as power supplies, enclosures, and the like.

When executed by processing circuitry 507, software modules 510-513 direct circuitry 507 to perform the following operations. UE modules 510 drive wireless transceivers 503-504 to exchange wireless user data with UEs and wireless repeaters. Network modules 511 drive network transceivers 505-506 to exchange user data with a core data network. UE distance modules 512 determine fine distance between base station 500 and UEs as described above. Repeater modules 513 maintain data structures for repeater chains like data structure 300 that correlates base stations with their served repeater chain hop counts, ranges, and processing delays.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication network to determine fine distance between a wireless base station and User Equipment (UE), the method comprising:
    determining Round Trip Delay (RTD) between the wireless base station and the UE;
    determining if the RTD indicates that the UE is beyond a wireless base station range and if the wireless base station serves a wireless repeater chain;
    determining a number of repeater hops between the wireless base station and the UE responsive to the RTD indicating that the UE is beyond the wireless base station range and the wireless base station serving the wireless repeater chain; and
    determining the fine distance between the wireless base station and the UE based on the number of repeater hops.

2. The method of claim 1 wherein determining if the RTD indicates that the UE is beyond the wireless base station range comprises:
    determining a rough distance between the wireless base station and the UE based on half of the RTD; and
    determining if the rough distance indicates that the UE is beyond the wireless base station range.

3. The method of claim 1 wherein determining the number of repeater hops between the wireless base station and the UE comprises determining the number of repeater hops based on internal processing delays in wireless repeaters in the wireless repeater chain.

4. The method of claim 1 wherein determining the number of repeater hops between the wireless base station and the UE comprises determining the number of repeater hops based on wireless repeater ranges of wireless repeaters in the wireless repeater chain.

5. The method of claim 1 wherein determining the number of repeater hops between the wireless base station and the UE comprises determining the number of repeater hops based on the wireless base station range.

6. The method of claim 1 wherein determining the fine distance between the wireless base station and the UE based on the number of repeater hops comprises determining the fine distance based on removing internal processing delays from the RTD for wireless repeaters in the wireless repeater chain.

7. The method of claim 1 wherein determining the fine distance between the wireless base station and the UE based on the number of repeater hops comprises determining the fine distance based on summing internal processing delays of wireless repeaters in the wireless repeater chain and subtracting the resulting processing delay sum from half of the RTD.

8. The method of claim 1 further comprising maintaining a data structure that correlates the wireless base station with wireless repeater ranges for wireless repeaters in the wireless repeater chain.

9. The method of claim 1 further comprising maintaining a data structure that correlates the wireless base station with internal processing delays for wireless repeaters in the wireless repeater chain.

10. The method of claim 1 further comprising maintaining a data structure that correlates the wireless base station with an indication that the wireless base station serves the wireless repeater chain.

11. A wireless communication network to determine fine distance between a wireless base station and User Equipment (UE), the method comprising:
    a wireless repeater chain comprising wireless repeaters configured to serve the UE; and
    the wireless base station configured to determine Round Trip Delay (RTD) between the wireless base station and the UE, determine if the RTD indicates that the UE is beyond a wireless base station range and if the wireless base station serves a wireless repeater chain, determine a number of repeater hops between the wireless base station and the UE responsive to the RTD indicating that the UE is beyond the wireless base station range and the wireless base station serving the wireless repeater chain, and determine the fine distance between the wireless base station and the UE based on the number of repeater hops.

12. The wireless communication network of claim 11 wherein the wireless base station is configured to determine a rough distance between the wireless base station and the UE based on half of the RTD and determine if the rough distance indicates that the UE is beyond the wireless base station range.

13. The wireless communication network of claim 11 wherein the wireless base station is configured to determine the number of repeater hops based on internal processing delays in wireless repeaters in the wireless repeater chain.

14. The wireless communication network of claim 11 wherein the wireless base station is configured to determine the number of repeater hops based on wireless repeater ranges of wireless repeaters in the wireless repeater chain.

15. The wireless communication network of claim 11 wherein the wireless base station is configured to determine the number of repeater hops based on the wireless base station range.

16. The wireless communication network of claim 11 wherein the wireless base station is configured to determine the fine distance based on removing internal processing delays from the RTD for wireless repeaters in the wireless repeater chain.

17. The wireless communication network of claim 11 wherein the wireless base station is configured to determine the fine distance based on summing internal processing delays of wireless repeaters in the wireless repeater chain and subtracting the resulting processing delay sum from half of the RTD.

18. The wireless communication network of claim 11 wherein the wireless base station is configured to maintain a data structure that correlates the wireless base station with wireless repeater ranges for wireless repeaters in the wireless repeater chain.

19. The wireless communication network of claim 11 wherein the wireless base station is configured to maintain a data structure that correlates the wireless base station with internal processing delays for wireless repeaters in the wireless repeater chain.

20. The wireless communication network of claim 11 wherein the wireless base station is configured to maintain a data structure that correlates the wireless base station with an indication that the wireless base station serves the wireless repeater chain.

* * * * *